US010972477B1

(12) United States Patent
McCorkendale

(10) Patent No.: US 10,972,477 B1
(45) Date of Patent: Apr. 6, 2021

(54) SYSTEMS AND METHODS FOR PERFORMING MICRO-SEGMENTING

(71) Applicant: Symantec Corporation, Mountain View, CA (US)

(72) Inventor: Bruce McCorkendale, Manhattan Beach, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 196 days.

(21) Appl. No.: 16/142,235

(22) Filed: Sep. 26, 2018

(51) Int. Cl.
*H04L 29/06* (2006.01)

(52) U.S. Cl.
CPC .......... *H04L 63/108* (2013.01); *H04L 63/102* (2013.01); *H04L 63/1433* (2013.01); *H04L 63/20* (2013.01)

(58) Field of Classification Search
CPC . H04L 63/108; H04L 63/102; H04L 63/1433; H04L 63/20
See application file for complete search history.

(56) References Cited

U.S. PATENT DOCUMENTS

| 8,205,239 B1* | 6/2012 | Satish | H04L 63/126 |
| | | | 726/1 |
| 2013/0097699 A1* | 4/2013 | Balupari | H04L 63/1441 |
| | | | 726/22 |
| 2018/0054697 A1* | 2/2018 | Mahidhara | H04L 63/0428 |

* cited by examiner

*Primary Examiner* — Oleg Korsak
(74) *Attorney, Agent, or Firm* — FisherBroyles, LLP

(57) ABSTRACT

The disclosed computer-implemented method for performing micro-segmenting may include (i) identifying at least a portion of a device, (ii) measuring a variance value that indicates a level of variance in terms of websites accessed by the portion of the device over a period of time, and (iii) locking, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time. Various other methods, systems, and computer-readable media are also disclosed.

20 Claims, 7 Drawing Sheets

SYSTEMS AND METHODS FOR PERFORMING MICRO-SEGMENTING

BACKGROUND

In the context of computer security systems, "micro-segmentation" is the idea of locking down a system based on what that system is legitimately expected to do. In some examples, security vendors may plan on identifying devices that have website access patterns that are simple enough that the security vendors will feel confident that restricting those devices to the previously accessed websites will enable proper use of the device while also protecting against rogue behavior in the case that the device has become infected.

Nevertheless, according to some related systems, security vendors may only feel confident in applying micro-segmentation to devices that have website access patterns that are exceptionally simple, such as a device that only visits five separate unique domains. Although these related systems may provide some benefits, the list of sites that most devices access can vary wildly and will likely change over time. This is likely true even for relatively simple devices. In addition, some security vendors may profile the behavior of each device as a whole, yet these devices may typically execute a LINUX-based operating system that is running several sub-components. The instant disclosure, therefore, identifies and addresses a need for improved systems and methods for performing micro-segmenting.

SUMMARY

As will be described in greater detail below, the instant disclosure describes various systems and methods for performing micro-segmenting. In one example, a computer-implemented method for performing micro-segmenting may include (i) identifying at least a portion of a device, (ii) measuring a variance value that indicates a level of variance in terms of websites accessed by the portion of the device over a period of time, and (iii) locking, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time.

In one embodiment, the variance value that indicates the level of variance in terms of websites accessed by the portion of the device over the period of time further indicates a number of unique domains accessed by the portion of the device over the period of time. In some examples, applying the security profile to the portion of the device limits the portion of the device to accessing those domains included within the number of unique domains accessed by the portion of the device over the period of time.

In one embodiment, the variance value that indicates the level of variance in terms of websites accessed by the portion of the device over the period of time further indicates a level of variance in terms of categories assigned to the websites accessed by the portion of the device over the period of time. In some examples, applying the security profile to the portion of the device limits the portion of the device to accessing websites assigned to at least one of the same categories assigned to the websites accessed by the portion of the device over the period of time.

In one embodiment, the variance value that indicates the level of variance in terms of websites accessed by the portion of the device over the period of time further indicates a level of variance in terms of measurements of security riskiness assigned to the websites accessed by the portion of the device over the period of time. In some examples, applying the security profile to the portion of the device limits the portion of the device to accessing websites having measurements of security riskiness corresponding to the measurements of security riskiness assigned to the websites accessed by the portion of the device over the period of time.

In some examples, identifying at least a portion of the device may include either identifying the entire device or identifying a subsystem executing on the device. In one embodiment, (i) identifying at least a portion of the device includes identifying the subsystem executing on the device, and (ii) the method further includes (a) identifying an additional second device, (b) detecting that the additional second device also contains another instance of the subsystem executing on the device, and (c) applying, based on detecting that the additional second device also contains another instance of the subsystem executing on the device, the security profile to the instance of the subsystem executing on the additional second device.

In some examples, the computer-implemented method may further include uploading at least two of the following items of information in association with each other to a centralized security server to enable the centralized security server to share these items of information with other customer client devices in a field of customer client devices: (i) an identifier of the portion of the device, (ii) the variance value that indicates the level of variance in terms of websites accessed by the portion of the device over the period of time, (iii) identifiers of the websites accessed by the portion of the device over the period of time, and (iv) the security profile.

In one embodiment, a system for implementing the above-described method may include (i) an identification module, stored in memory, that identifies at least a portion of a device, (ii) a measurement module, stored in memory, that measures a variance value that indicates a level of variance in terms of websites accessed by the portion of the device over a period of time, (iii) a locking module, stored in memory, that locks, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time, and (iv) at least one physical processor configured to execute the identification module, the measurement module, and the locking module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify at least a portion of a device, (ii) measure a variance value that indicates a level of variance in terms of websites accessed by the portion of the device over a period of time, and (iii) lock, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
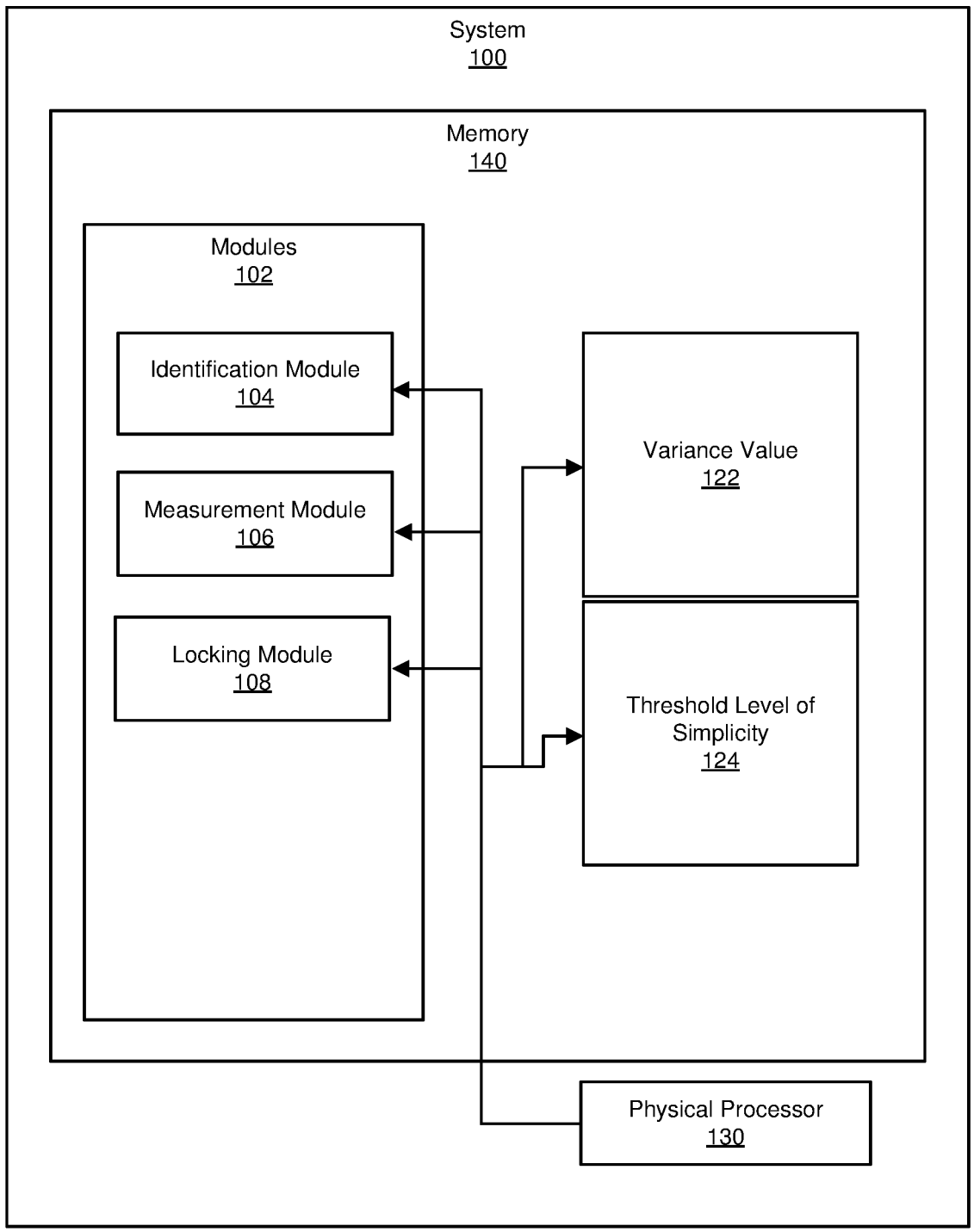
FIG. 1 is a block diagram of an example system for performing micro-segmenting.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for performing micro-segmenting. The disclosed subject matter may improve upon related systems by increasing the number of devices that a security vendor, or corresponding security system, may successfully micro-segment to protect a customer from security threats. In some examples, the disclosed subject matter may achieve this improvement by dynamically measuring a measurement of variance for the website access patterns by the device, and then applying a security profile to the device in response to determining that the measurement of variance satisfies a threshold level of simplicity. The disclosed subject matter may perform this measurement of variance upon first detecting the presence of the device. Additionally, the disclosed subject matter may achieve this improvement by limiting one or more instances of future access by the device to unique domains previously accessed by the device, websites having categories that are the same as websites previously accessed by the device during an observation period, and/or websites having measurements of security risks that are corresponding to those of websites accessed by the device during the observation period. In other words, the disclosed subject matter may improve upon related systems by dynamically defining a set of whitelisted websites in terms of websites that the device accessed during a previous observation period and/or the categories or security riskiness measurements previously assigned to those websites.

Figure 2:
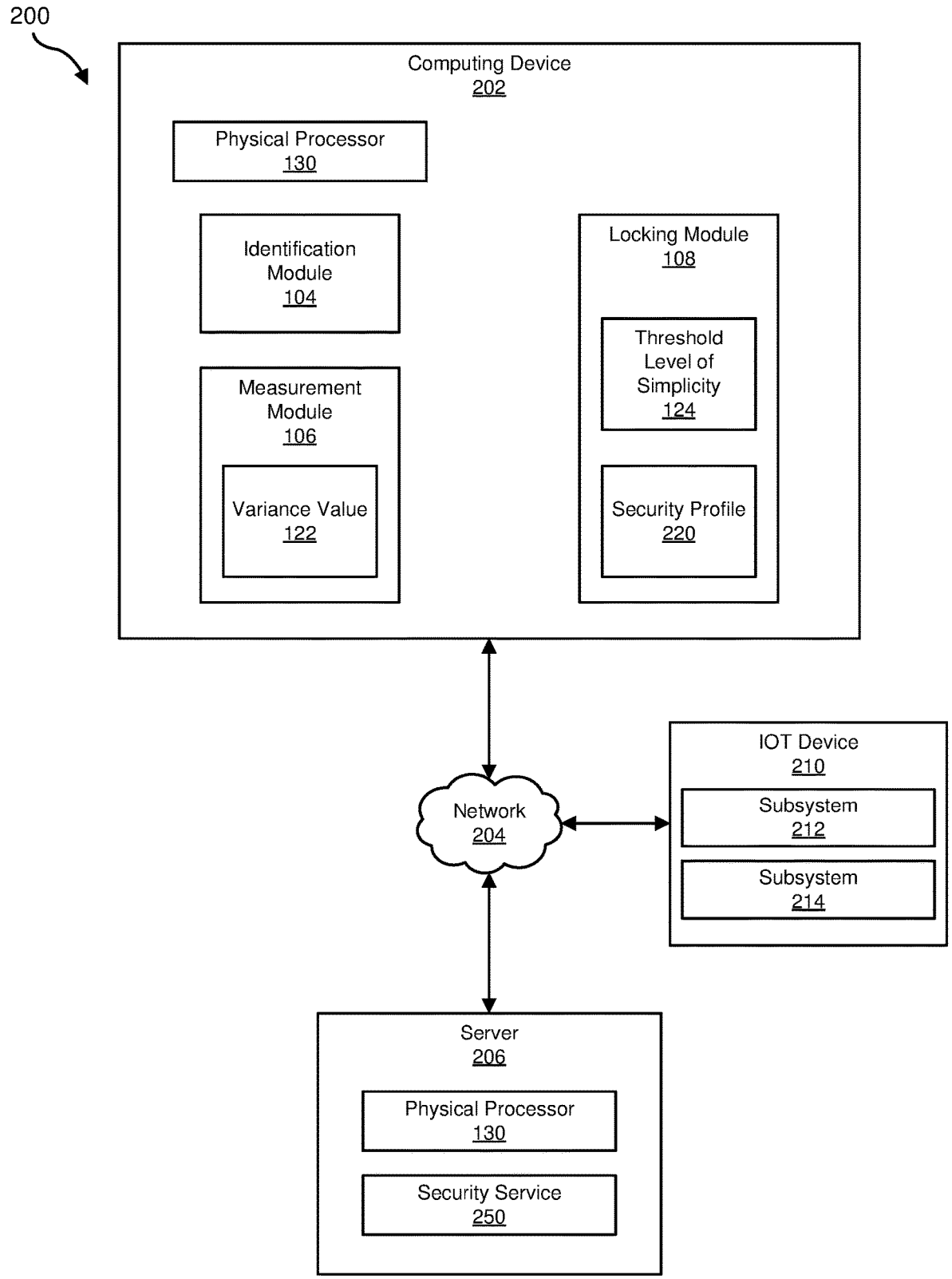
FIG. 2 is a block diagram of an additional example system for performing micro-segmenting.

The following will provide, with reference to FIGS. 1-2, detailed descriptions of example systems for performing micro-segmenting. Detailed descriptions of corresponding computer-implemented methods will also be provided in connection with FIG. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for performing micro-segmenting. As illustrated in this figure, example system 100 may include one or more modules 102 for performing one or more tasks. For example, and as will be explained in greater detail below, example system 100 may include an identification module 104 that identifies at least a portion of a device. Example system 100 may additionally include a measurement module 106 that measures a variance value 122 that indicates a level of variance in terms of websites accessed by the portion of the device over a period of time. Example system 100 may also include a locking module 108 that locks, in response to determining that variance value 112 satisfies a threshold level of simplicity 124, the portion of the device by applying a security profile to the portion of the device that limits the portion of the device to accessing a set of websites that is defined in terms of the websites accessed by the portion of the device over the period of time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing micro-segmenting. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

For example, and as will be described in greater detail below, identification module 104 may identify at least a portion of a device, such as a new IOT device 210. Measurement module 106 may measure variance value 122 that indicates a level of variance in terms of websites accessed by the portion of IOT device 210 over a period of time. Locking module 108 may lock, in response to determining that variance value 122 satisfies threshold level of simplicity 124, the portion of IOT device 210 by applying a security profile 220 to the portion of IOT device 210 that limits the portion of IOT device 210 to accessing a set of websites that is defined in terms of the websites accessed by the portion of IOT device 210 over the period of time.

Computing device 202 generally represents any type or form of computing device capable of reading computer-executable instructions. In one illustrative example, computing device 202 may correspond to a smart home wireless gateway (or other intermediary network node performing security features) that is provided by a security vendor and configured to perform one or more security procedures in accordance with method 300, as discussed in more detail below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300, as discussed in more detail below. In one illustrative example, server 206 may correspond to a backend management server provided by a security vendor and its corresponding security service 250. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
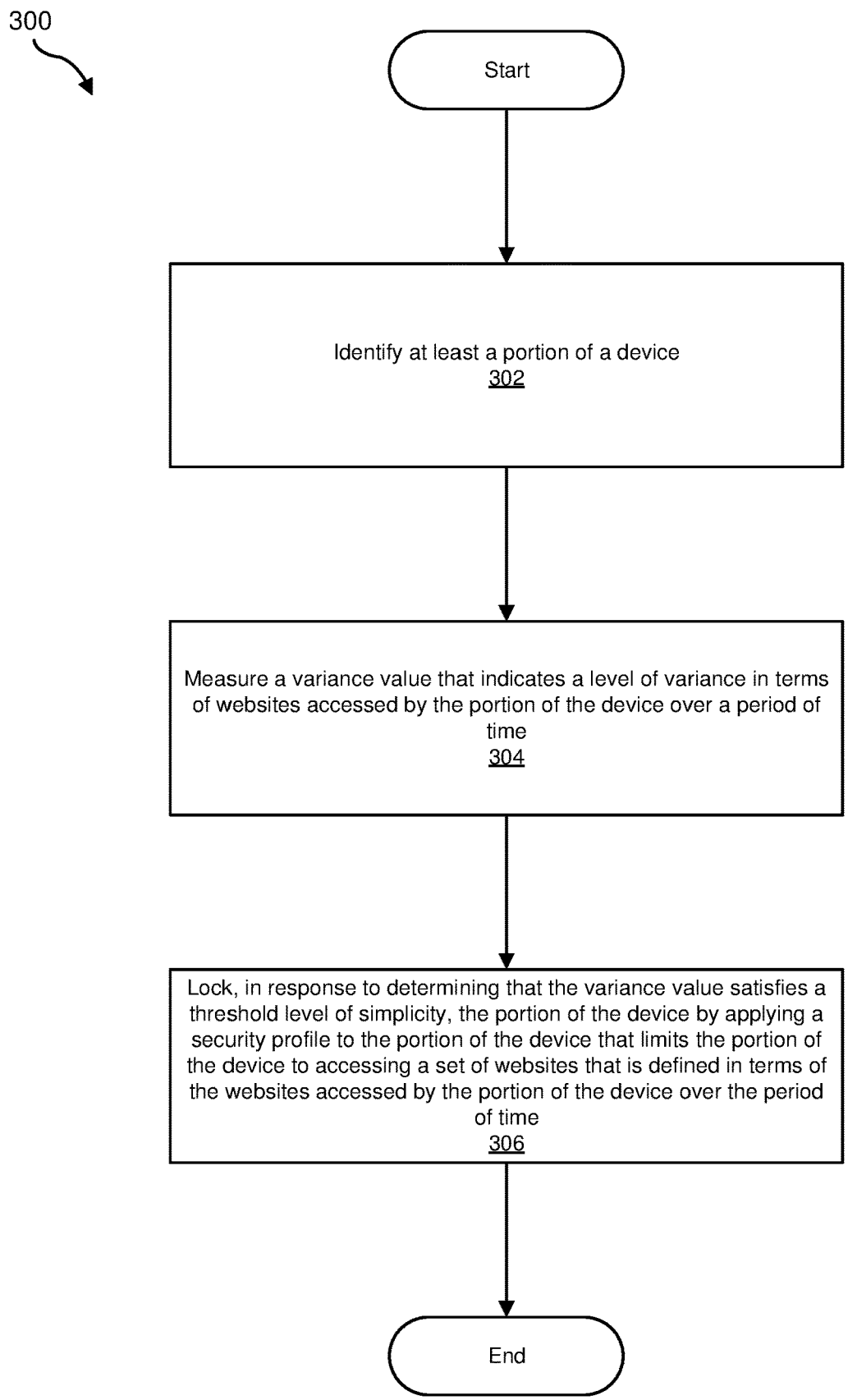
FIG. 3 is a flow diagram of an example method for performing micro-segmenting.

FIG. 3 is a flow diagram of an example computer-implemented method 300 for performing micro-segmenting. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify at least a portion of a device. For example, identification module 104 may, as part of computing device 202 in FIG. 2, identify at least a portion of IOT device 210.

Identification module 104 may identify at least a portion of the device in a variety of ways. As used herein, the phrase "identify at least a portion of the device" generally refers to identifying either the entire device, or instead identifying a subset portion of the device, as the candidate target for applying the security profile in accordance with step 306 of method 300, as discussed in more detail below. In other words, at step 302, identification module 104 may identify either an entire device or instead identify a subset or subcomponent of that device, which may then form the basis for performing the remainder of method 300. For example, in the case of FIG. 2, identification module 104 may identify the entirety of IOT device 210 as a candidate target for the application of security profile 220. Although, in this illustrative example, identification module 104 may identify the entirety of IOT device 210, the disclosed subject matter is not limited to identifying IOT devices and, instead, the disclosed subject matter may apply more broadly to any suitable software, firmware, hardware, and/or networking device, component, and/or subsystem. Returning to the example of FIG. 2, identification module 104 may, at step 302, identify a subsystem executing on IOT device 210 as a candidate target for applying security profile 220, rather than identifying the entirety of IOT device 210. For example, identification module 104 may identify subsystem 212 and/or subsystem 214, which are both shown in FIG. 2, as the candidate target for applying security profile 220 in accordance with method 300.

In some examples, identification module 104 may identify at least a portion of the device in response to the device first being purchased, installed, plugged in, turned on, executed, operated, and/or connected to a network, such as a home wireless network. For example, identification module 104 may be implemented as part of a smart home wireless router, which may have been configured by a security vendor that provides the smart home wireless router with security software, corresponding to modules 102, which may effectively monitor for the presence of one or more additional devices within the home, or other location, of the smart home wireless router. In this case, computing device 202 of FIG. 2 will correspond to the smart home wireless router. As one illustrative example, the smart home wireless router may correspond to the NORTON CORE wireless router provided by SYMANTEC CORPORATION. Accordingly, in these examples, identification module 104, may, as part of the smart home wireless router, detect whenever a new device connects to one or more wireless networks, or other networks, provided by computing device 202. In response, identification module 104 may notify measurement module 106, thereby triggering measurement module 106 to perform step 304, as discussed in more detail below.

Returning to FIG. 3, at step 304, one or more of the systems described herein may measure a variance value that indicates a level of variance in terms of websites accessed by the portion of the device over a period of time. For example, at step 304, measurement module 106 may, as part of computing device 202, measure variance value 122 that indicates a level of variance in terms of websites accessed by the portion of IOT device 210 over a period of time. As used herein, the term "variance value" is broadly defined to include any measurement or indication of variance, complexity, differentiation, and/or lengthiness (e.g., a lengthiness of a list of unique domains, unique website categories, and/or unique website measurements of security riskiness levels for websites accessed by IOT device 210 over a period of time). As used herein, the term "websites" is defined broadly to generally encompass any network location (e.g., "symantec.com" that might provide downloadable information to one or more computing devices that are connected to a public or private network. In some examples, "websites" may refer to conventional websites on the World Wide Web or Internet.

Measurement module 106 may measure the variance value in a variety of ways. In one embodiment, the variance value further indicates a number of unique domains accessed by the portion of the device over the period of time. For example, over a period of time, such as an observational period of time, measurement module 106 may detect that IOT device 210 attempts to access five separate unique domains, "google.com[,]" "amazon.com[,]" "netflix.com[,]" "roku.com[,]" and "malware.com[.]" Because measurement module 106 may only count a number of unique domains accessed by the device over the observational period of time, the corresponding device may access any one of these identified unique domains a multitude of times, without further altering the count of unique domains. For example, a device such as IOT device 210 may access "google.com" 10 separate times and also access "roku.com" 20 separate times, and yet all of these different instances of website access will only result in the addition of two unique domains to the list of unique domains counted by measurement module 106.

Additionally, or alternatively, measurement module 106 may measure the variance value by measuring a value that further indicates a level of variance in terms of categories assigned to the websites accessed by the portion of the device over the period of time. Returning to the example just outlined above, the website "google.com" may have a category of "search engine." Similarly, the website "amazon.com" may have the category "e-commerce." Furthermore, both the website "netflix.com" and the website "roku.com" may have the same category of "entertainment." Lastly, the website "malware.com" may have the category "malware." Accordingly, in this example measurement module 106 may measure the variance value in terms of a level of variance between these categories that have been previously assigned to these different websites. For example, security service 250 at server 206 may have previously assigned these categories to the websites. Additionally, or alternatively, computing device 202 may maintain a local copy of popular websites, such as those listed above, as well as categories that have been previously assigned to them by security service 250. In one specific example, measurement module 106 may measure the variance value by counting a number of unique categories that have been assigned to the websites that IOT device 210 attempts to access over the observational period of time. In the specific example of those websites that are listed above, measurement module 106 may therefore count four separate categories that have been assigned to these five different websites (i.e., the search engine category, the e-commerce category, the entertainment category, and the malware category). Of course, in this example the categories are defined broadly, but the disclosed subject matter is not limited in this regard. Accordingly, in other examples, the categories may be defined at a more specifically granular level (e.g., "subscription movie streaming" as a category for "netflix.com" rather than the more generic category of "entertainment").

Alternatively, instead of merely counting the number of unique categories assigned to the websites that the device, such as IOT device 210, attempted to access over the observational period of time, measurement module 106 may instead use any other alternative or suitable measurement of variance. For example, in some examples measurement module 106 may measure the variance value using the number of unique categories as merely one factor in an overall calculation, such as a calculation that divides the total number of unique domains by the total number of instances of accessing websites. Additionally, or alternatively, in some examples measurement module 106 may calculate the ratio of unique categories divided by the number of unique domains with respect to the websites that IOT device 210 attempted to access over the observational period of time. Measurement module 106 may also use any other suitable measurement of variation, complexity, differentiation, and/or lengthiness, as further discussed above.

Additionally, or alternatively, as a third example measurement module 106 may measure the variance value by measuring a value that indicates a level of variance in terms of measurements of security riskiness assigned to the websites accessed by the portion of the device over the period of time. Returning to the example of the five websites first listed above, measurement module 106 may measure the following measurements of security riskiness assigned to these five websites. For example, measurement module 106 may measure that the following four websites have a predefined measurement or security riskiness category of "known safe": "google.com[,]" "amazon.com[,]" "netflix.com[,]" and "roku.com[.]" This predefined measurement or security riskiness category may reflect the fact that these are domains for widely popular corporate enterprise organizations with trusted reputations for producing safe websites, applications, software, devices, etc. In contrast, measurement module 106 may measure that the "malware.com" website has a predefined measurement or security riskiness category of "known unsafe." Additionally, or alternatively, in other examples measurement module 106 may measure other different websites as having security riskiness categories of "unknown," thereby reflecting the fact that measurement module 106 may not have access to the previously assigned category, or other information indicating security riskiness, for these different websites. Moreover, in the above examples the measurements or categories of security riskiness are defined relatively broadly (e.g., "known safe," "known unsafe," and "unknown"). Nevertheless, in additional or alternative examples, measurement module 106 may use any other suitable granularity of categories or measurements to indicate security riskiness levels for corresponding websites. For example, measurement module 106 may use a larger and more granular set of categories. Additionally, or alternatively, measurement module 106 may use a numerical scale, such as a scale from 0-10, where 0 may indicate a total lack of safety and 10 may indicate a total degree of safety. Moreover, in these examples, measurement module 106 may optionally use any level of granularity along the scale to measure the security riskiness levels of corresponding websites. For example, measurement module 106 may first map the measurement of security riskiness for various websites onto highly granular numerical values, and subsequently measurement module 106 may then map these highly granular numerical values into larger ranges of values corresponding to more generic categories of security riskiness, such as "highly safe," "safe," "unsafe," and "highly unsafe."

Figure 4:
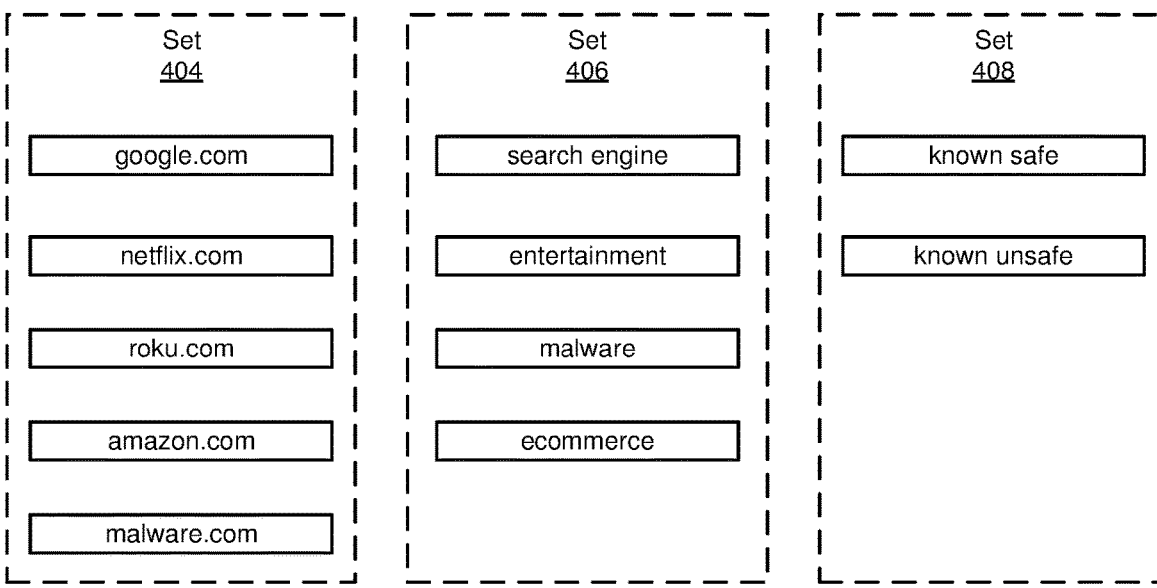
FIG. 4 is a block diagram of an example set of websites accessed by a portion of the device over a period of time.

FIG. 4 provides a block diagram 400 that corresponds to the example of unique domains that the device accessed over the observational period of time, as further discussed above. As further shown in this figure, unique domains accessed 402 includes each of the unique domains that were listed in the discussion above: "google.com[,]" "amazon.com[,]" "netflix.com[,]" "roku.com[,]" and "malware.com[.]" Additionally, unique domains accessed 402 also lists the corresponding categories that were previously assigned to each of these unique domains: the search engine category, the e-commerce category, the entertainment category, and the malware category. Similarly, unique domains accessed 402 also lists the corresponding measurements of security riskiness that were previously assigned to each of these unique domains, such as "known safe" and "known unsafe."

At step 306, one or more of the systems described herein may lock, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time. For example, locking module 108 may, as part of computing device 202 in FIG. 2, lock, in response to determining that variance value 122 satisfies threshold level of simplicity 124, the portion of IOT device 210 applying security profile 220 to the portion of IOT device 210 that limits the portion of IOT device 210 to accessing a set of websites that is defined in terms of the websites accessed by the portion of IOT device 210 over the period of time.

As used herein, the term "threshold level of simplicity" is generally defined broadly in terms of a simple threshold along a spectrum according to which the variance value was previously measured at step 304 of method 300, as further discussed above. For example, if measurement module 106 measures the variance value as a measurement of variance, differentiation, complexity, and/or lengthiness along a scale from 0 to 10 at step 304, then the threshold level of simplicity may simply correspond to any arbitrary or suitable threshold along the spectrum that may be used for the successful performance of method 300. In general, security service 250 may select a value for the threshold level of simplicity such that the threshold level of simplicity indicates that the level of variance is sufficiently low that the security profile may be successfully applied to the portion of the device without significantly inhibiting its proper functionality (e.g., a device that only accesses five unique domains may be limited to accessing those five unique domains without significantly inhibiting its proper functionality).

Locking module 108 may apply the security profile to the portion of the device in a variety of ways. For example, in the case of measurement module 106 counting the number of unique domains that the device attempted to access over the observational period of time, then locking module 108 may apply the security profile to the portion of the device such that the security profile limits the portion of the device to accessing those domains included within the number of unique domains accessed by the portion of the device over the period of time. Accordingly, in the specific example of unique domains that are listed above, locking module 108 may apply the security profile by limiting an ability of the device to access those five specific domains (i.e., "netflix.com[,]" "amazon.com[,]" "roku.com[,]" "google.com[,]" and "malware.com"). Additionally, or alternatively, locking module 108 may optionally apply the security profile by limiting the ability of the device to access a filtered subset of this list of unique domains. For example, locking module 108 may optionally filter one or more unique domains that are categorized as "known unsafe," from the list of unique domains that the device is permitted to access. Accordingly, in this case, locking module 108 may optionally limit the ability of the device to access "malware.com" but not "netflix.com[,]" "amazon.com[,]" "roku.com[,]" and "google.com[.]" Returning to the example of FIG. 4, locking module 108 may establish a set 404 of unique domains that the device is permitted to access based on the performance of step 304 and step 306, as further discussed above. Accordingly, in this example set 404 includes each of the unique domains further listed above as having been accessed by the device over the observational period of time.

Additionally, or alternatively, in the case that measurement module 106 measures the variance value by measuring a level of variance in terms of categories assigned to the websites accessed by the portion of the device over the period of time, then locking module 108 may apply the security profile to the portion of the device such that the security profile limits the portion of the device to accessing websites assigned to at least one of the same categories assigned to the websites accessed by the portion of the device over the period of time. Returning to the list of unique domains that IOT device 210 attempted to access over the observational period of time, as further discussed above, locking module 108 may, in this example, limit the ability of the device to access unique domains that are categorized with at least one of the categories that applied to these unique domains. As further discussed above, the five unique domains that the device attempted to access during the observational period of time (i.e., "netflix.com[,]" "amazon.com[,]" "roku.com[,]" "google.com[,]" and "malware.com[.]") have the categories entertainment, search engine, e-commerce, and malware.

In view of the above, in this example, locking module 108 may optionally limit the device to accessing websites, and/or unique domains, that have at least one of these four separate categories (e.g., as defined according to security service 250 of FIG. 2). Returning to the example of FIG. 4, locking module 108 may optionally create another set 406, which includes a list of each of the categories for the unique domains that the device accessed over the observational period of time, as further discussed above. Accordingly, as shown in this figure, set 406 may include each of the following categories: entertainment, search engine, e-commerce, and malware.

Figure 5:
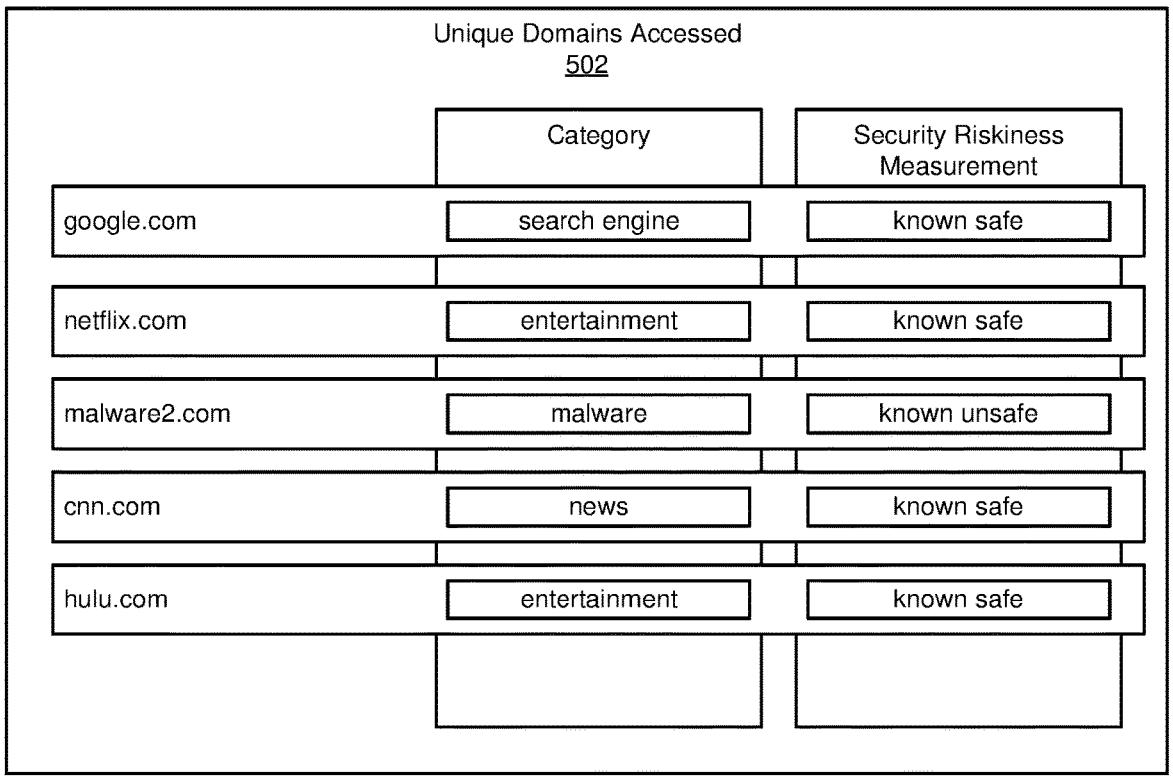
FIG. 5 is a block diagram of another example set of websites that the same portion of the device attempts to access over a subsequent period of time.

Accordingly, in this example, even if IOT device 210 attempts to access a new unique domain or website that IOT device 210 had not previously attempted to access during the observational period of time, then in this case locking module 108 may still nevertheless permit IOT device 210 to access this unique domain or website, but only if this new unique domain or website has at least one of the four separate categories identified above (i.e., entertainment, search engine, e-commerce, and/or malware). For example, FIG. 5 shows another block diagram 500 that includes unique domains accessed 502, which may list unique domains accessed by the device over an additional and subsequent period of time, which occurs after the observational period of time (e.g., which may include any statically or dynamically predefined period of time for observing website access patterns in order to perform method 300), and during which the security policy of step 306 applies. As further shown in this figure, unique domains accessed 502 may include "cnn.com" and "hulu.com." Accordingly, in this example, when locking module 108 applies the security policy to the device during the subsequent period of time, locking module 108 may optionally permit the device to access the website "hulu.com," even though the device had not previously accessed that same website during the observational period of time, because that website has the same category (i.e., "entertainment") that was previously detected during the observational period of time, and which is included within set 406 shown in FIG. 4. In contrast, unique domains accessed 502 also includes a newly encountered domain, "cnn.com," which has a category of "news." Accordingly, in this example, locking module 108 may optionally prevent the device from accessing this specific and newly encountered unique domain, because not only was the unique domain not previously encountered during the observational period of time, but it also has a category (i.e., "news") that was never encountered during the observational period of time and, therefore, was never included within set 406 shown in FIG. 4.

Of course, as in the first example listed above, locking module 108 may also in this example filter, alter, revise, and/or improve the list of categories for unique domains or websites that the devices permitted to access. For example, in the scenario outlined above it would be natural and beneficial to filter the category "malware" from the list of categories for unique domains or websites that the device is permitted to access.

Additionally, or alternatively, in the case of measurement module 106 measuring the variance value by measuring a value that indicates a level of variance in terms of measurements of security riskiness assigned to the websites accessed by the portion of the device over the period of time, as further outlined above, then in this case locking module 108 may apply the security profile to the portion of the device by limiting the portion of the device to accessing websites having measurements corresponding to the measurements of security riskiness assigned to the websites accessed by the portion of the device over the period of time. As used herein, the phrase "limiting the portion of the device to accessing websites having measurements corresponding to the measurements of security riskiness assigned to the websites accessed by the portion of the device over the period of time," generally refers to locking module 108 establishing a model, heuristic, and/or security profile, which is defined in terms of the measurements of security riskiness assigned to the websites accessed by the portion of the device over the period of time, and which can accept, as new inputs, new websites or unique domains that the device has attempted to access and thereby decide whether the device is accordingly permitted, or disallowed, from accessing these new unique domains or websites. In the specific example of FIG. 4, locking module 108 may optionally limit the device over the subsequent period of time to accessing websites having measurements of security riskiness that are listed within set 408, which corresponds to the list of measurements and/or categorizations of security riskiness that were encountered for the unique domains listed within unique domains accessed 402.

In one example, when measurement module 106 determines that the specific measurement of variance is sufficiently low to satisfy threshold level of simplicity 124, then measurement module 106 may thereby indicate that the substantial majority, or predominant majority, of unique domains that the device accessed over the observational period of time are categorized as "known safe," because four out of the five unique domains that the device attempted to access over the observational period of time have this categorization of security riskiness. Accordingly, in this example, locking module 108 may optionally discard the remaining minority of security riskiness categorizations, such as the categorization for "malware.com," and thereby only permit the device to access websites for unique domains having the security riskiness categorization of "known safe," which corresponds to the predominant majority of those unique domains that the device accessed over the observational period of time, as further discussed above.

Additionally, or alternatively, locking module 108 may permit the device, in this example, to access not only websites or unique domains having the security riskiness classification of "known safe," but also one or more other websites having a different security riskiness classification, such as "known unsafe" and/or "unknown." Nevertheless, in this example, locking module 108 may also limit the ability of the device to access websites or unique domains having these additional security riskiness classifications such that the device may only do so within the permitted range of security riskiness variability. For example, in the scenario outlined above only 20%, or one-fifth, of the websites or unique domains that the device accessed over the observational period of time have a security riskiness classification of "known unsafe." Accordingly, in this scenario, locking module 108 may optionally limit the ability of the device to access websites or unique domains having the security riskiness classification of "known unsafe," but only so long as these constitute less than 20% of the unique domains accessed by the device over a future period of time during which the security profile applies.

Additionally, or alternatively, in some examples locking module 108 may apply the security profile by applying the security profile to a different instance of the same device (e.g., the same model, same brand, same serial number of device, etc.) and/or by applying the security profile to a different instance of the same subsystem of the first device (e.g., IOT device 210) that is also executing on a second additional device. In this example, identification module 104 may optionally identify at least a portion of the device by identifying a subsystem executing on the device. For example, identification module 104 may identify subsystem 212 and/or subsystem 214 that is executing on IOT device 210. Illustrative examples of such subsystems may include any software, firmware, hardware, virtual, and/or network component or subcomponent, and/or any corresponding script or service executing therein. Accordingly, in this example, identification module 104 may further identify an additional second device, such as an additional instance of IOT device 210 (e.g., an additional instance of a ROKU device for a second television within the customer's household). Subsequently, locking module 108 may detect that the additional second device also contains another instance of the subsystem, such as subsystem 212 and/or subsystem 214, that is executing on IOT device 210. Consequently, in this example, locking module 108 may furthermore apply, based on detecting that the additional second device also contains another instance of the subsystem executing on IOT device 210, security profile 220 to the instance of the subsystem that is executing on the additional second device. Of course, in this example the two instances of IOT device 210 correspond to two instances of the same device executing the same subsystem. In other examples, however, two instances of the same subsystem may be executing on two different types or models of device, and nevertheless locking module 108 may still repeat the application of the security policy to both instances of the subsystem despite the fact that they are executing on two different models of device.

Moreover, in these examples, locking module 108 may optionally perform one or more of the above steps without performing one or more steps of method 300. For example, because locking module 108 has detected the essential similarity between two instances of the same device, and/or between two instances of the same subsystem, then modules 102 may not need to perform an additional instance of measuring the variance value and/or comparing the variance value to the threshold level of similarity, as further discussed above in connection with steps 304 and/or 306 of method 300. Accordingly, in these examples, locking module 108 may optionally reuse the results of previous instances of performing step 304 and/or 306 of method 300, without repeating these steps, for additional instances of the same device or subsystem, thereby increasing efficiency and preventing redundant calculations.

Additionally, or alternatively, in some examples locking module 108 may also optionally upload two or more of the following items of information in association with each other to a centralized security server, such as server 206, to enable the centralized security server to share these items of information with other customer client devices in a field of customer client devices. These items of information may include: (i) an identifier of the portion of the device, such as an identifier of IOT device 210, an identifier of subsystem 212, and/or an identifier of subsystem 214, (ii) the variance value, such as variance value 122, that indicates a level of variance in terms of websites accessed by the portion of the device over the period of time, (iii) identifiers of the websites accessed by the portion of the device over the period of time, and (iv) the security profile such as security profile 220. Accordingly, by optionally uploading one or more of these items of information to server 206, locking module 108 may enable server 206 to thereby share the results of performing instances of method 300 with one or more other customers of the same security vendor, such as a security vendor corresponding to server 206 and its associated security service 250.

As further outlined above, the disclosed subject matter may improve upon related systems by increasing the number of devices that a security vendor, or corresponding security system, may successfully micro-segment to protect a customer from security threats. In some examples, the disclosed subject matter may achieve this improvement by dynamically measuring a measurement of variance for the website access patterns by the device, and then applying a security profile to the device in response to determining that the measurement of variance satisfies a threshold level of simplicity. The disclosed subject matter may perform this measurement of variance upon first detecting the presence of the device. Additionally, the disclosed subject matter may achieve this improvement by limiting the future access by the device to unique domains previously accessed by the device, websites having categories that are the same as websites previously accessed by the device during an observation period, and/or websites having measurements of security risks that are corresponding to those of websites accessed by the device during the observation period. In other words, the disclosed subject matter may improve upon related systems by dynamically defining a set of whitelisted websites in terms of websites that the device accessed during a previous observation period and/or the categories or security riskiness measurements previously assigned to those websites, while optionally blacklisting all other websites, and moreover the disclosed subject matter may base the decision to apply the white list and/or blacklist on a comparison between the variance value and a threshold level of simplicity, as further outlined above.

The above discussion provides a general overview of the systems and methods corresponding to method 300 of FIG. 3. Additionally, or alternatively, the following provides a discussion of additional concrete and specific embodiments of the disclosed subject matter. Accordingly, in the following discussion, any suitable one of modules 102, including identification module 104, measurement module 106, and/or locking module 108 may perform any one or more of the following described steps, actions, and/or features, as appropriate.

The disclosed subject matter introduces the idea of website or unique domain categories, such as the categories provided by the WEBPULSE service provided by the security vendor of SYMANTEC CORPORATION, and/or risk-level ranges for such unique domains or websites, to thereby dynamically and intelligently lock down the website access usage of a device, such as an Internet-Of-Things device. Additionally, the disclosed subject matter introduces the idea of profiling services running in a device separately from profiling the device as a whole. This allows a security vendor to gain the protection of micro-segmentation for devices with more complex site access patterns. As a first step toward achieving this vision of computing system security, one can measure site access simplicity, which is just a test as to whether the total number of unique domains accessed by device is below (or, alternatively, below or equal to) a configured threshold over some observational period of time. Performing this test will provide a security vendor, or corresponding security service, with confidence that this is an accurate conclusion for this device. Once the security service has concluded that a device does exhibit site access simplicity, as indicated by this measurement of variance in comparison to a threshold level of simplicity, then the security service may also apply a policy that restricts the device such that it can only access the list of unique domains determined during the observational period of time.

Additionally, or alternatively, instead of profiling whole devices, the security service may also optionally use user-agent headers in website or HYPERTEXT TRANSFER PROTOCOL traffic, and/or any other suitable means, to identify and profile one or more subsystems that are running on the device. Accordingly, in these examples the security service may further apply one or more security profiles for any such services and/or subsystems that are recognized, regardless of which overall device the subsystems are found on. In this way, the security service may potentially cover more devices with fewer policies, since many devices will just be running some combination of previously identified and analyzed services. Moreover, even the same type of device may be running slightly different combinations of the underlying subsystems.

The observational period of time may optionally be determined by when some configurable maximum period has elapsed, and/or when there have been no changes in the attribute being measured for some configured period of stability. For site access simplicity, the attribute being measured may be the total number of unique domains accessed by a given device and/or subsystem. In addition to site access simplicity, the security service may also optionally measure categorical simplicity, risk-level simplicity, and/or device riskiness. The security service may track one or more of these values by tracking the range of categories that a security service or security vendor applied to these websites and/or the risk-levels accessed by the device over the observational period of time. Even for devices that are not site access simple, if the range of categories visited by the device is below a threshold, then the security service may conclude that the device indicates categorical simplicity. Accordingly, in these examples the security service may restrict the device to access only websites, or unique domains, within the range of categories that were previously observed during the observational period of time. By the security service using categorical simplicity, the security service may greatly increase the number and types of devices that can safely have this form of micro-segmentation applied to them.

Additionally, or alternatively, if the device veers away from established categorical simplicity, then the security service may conclude that this indicates anomalous behavior that is worth reporting to an administrator. Moreover, one or more measurements or categories of security riskiness, such as those assigned by a security server, security vendor, and/or security service, may be used to measure a level of security riskiness simplicity and/or plain device riskiness. When the security service has established across multiple routers, with some confidence, the simplicity measures for devices (e.g., and also basing the security profile on the device classification, such as laptop, desktop, phone, thermostat/IOT device, and/or specific device such as the iPhone), the security service may also maintain these items of information, in association with each other, in a global database.

In some scenarios the security service may encounter one or more devices that the security service has never before encountered. Accordingly, in these scenarios, the security service may request that the router (e.g., the router executing modules 102) start profiling the newly encountered device. For example, the security service may transmit the media access control address of the newly encountered device down to the router that is executing modules 102, thereby indicating that the router should be tracking the newly encountered device, as further discussed above.

Figure 6:
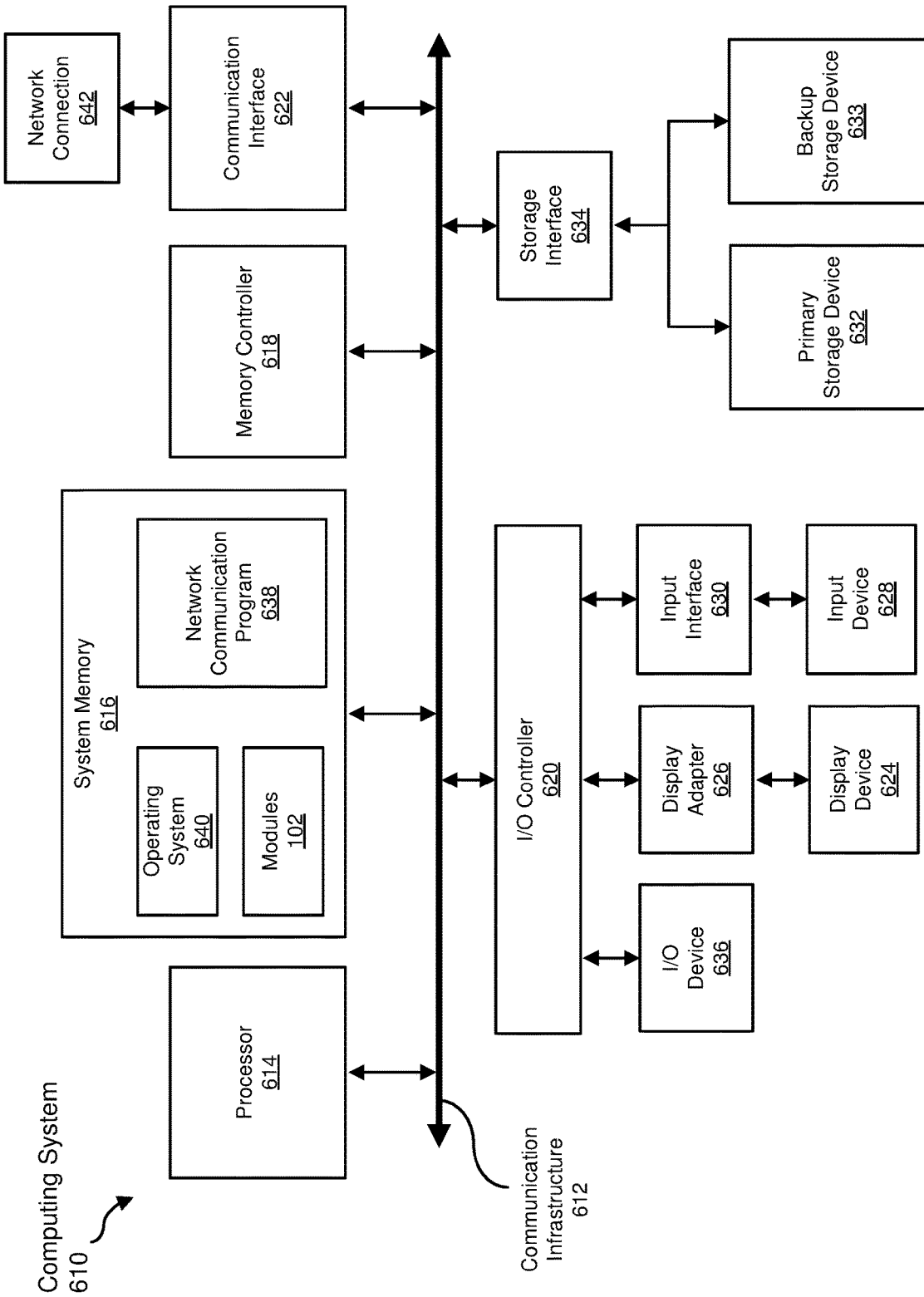
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
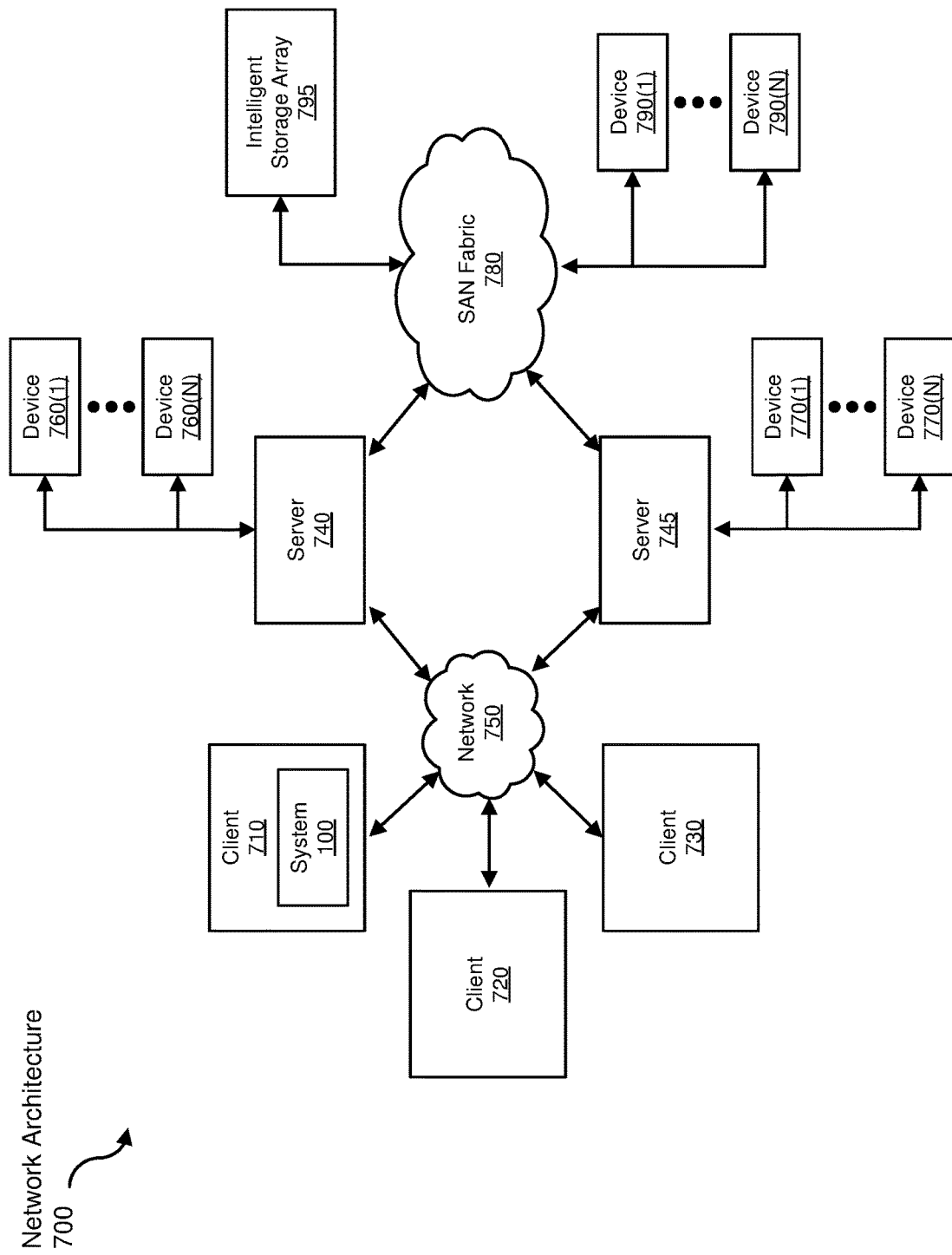
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for performing micro-segmenting.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing micro-segmenting, at least a portion of the method being performed by a computing device comprising at least one processor, the method comprising:
   identifying at least a portion of a device;
   measuring a variance value that indicates a level of variance in terms of websites accessed by the portion of the device over a period of time; and
   locking, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time.

2. The computer-implemented method of claim 1, wherein the variance value that indicates the level of variance in terms of websites accessed by the portion of the device over the period of time further indicates a number of unique domains accessed by the portion of the device over the period of time.

3. The computer-implemented method of claim 2, wherein applying the security profile to the portion of the device limits the portion of the device to accessing those domains included within the number of unique domains accessed by the portion of the device over the period of time.

4. The computer-implemented method of claim 1, wherein the variance value that indicates the level of variance in terms of websites accessed by the portion of the device over the period of time further indicates a level of variance in terms of categories assigned to the websites accessed by the portion of the device over the period of time.

5. The computer-implemented method of claim 4, wherein applying the security profile to the portion of the device limits the portion of the device to accessing websites assigned to at least one of the same categories assigned to the websites accessed by the portion of the device over the period of time.

6. The computer-implemented method of claim 1, wherein the variance value that indicates the level of variance in terms of websites accessed by the portion of the device over the period of time further indicates a level of variance in terms of measurements of security riskiness assigned to the websites accessed by the portion of the device over the period of time.

7. The computer-implemented method of claim 6, wherein applying the security profile to the portion of the device limits the portion of the device to accessing websites having measurements of security riskiness corresponding to the measurements of security riskiness assigned to the websites accessed by the portion of the device over the period of time.

8. The computer-implemented method of claim 1, wherein identifying at least a portion of the device comprises:
   identifying a subsystem executing on the device; or
   identifying the entire device.

9. The computer-implemented method of claim 8, wherein:
   identifying at least a portion of the device comprises identifying the subsystem executing on the device; and
   the method further comprises:
      identifying an additional, second device;
      detecting that the additional, second device also contains another instance of the subsystem executing on the device; and
      applying, based on detecting that the additional, second device also contains another instance of the subsystem executing on the device, the security profile to the other instance of the subsystem executing on the additional, second device.

10. The computer-implemented method of claim 1, wherein the threshold level of simplicity comprises a numerical threshold along a spectrum according to which the variance value is measured.

11. A system for performing micro-segmenting, the system comprising:
    an identification module, stored in memory, that identifies at least a portion of a device;
    a measurement module, stored in memory, that measures a variance value that indicates a level of variance in terms of websites accessed by the portion of the device over a period of time;
    a locking module, stored in memory, that locks, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time; and
    at least one physical processor configured to execute the identification module, the measurement module, and the locking module.

12. The system of claim 11, wherein the variance value that indicates the level of variance in terms of websites accessed by the portion of the device over the period of time further indicates a number of unique domains accessed by the portion of the device over the period of time.

13. The system of claim 12, wherein the locking module applies the security profile to the portion of the device such that the security profile limits the portion of the device to accessing those domains included within the number of unique domains accessed by the portion of the device over the period of time.

14. The system of claim 11, wherein the variance value that indicates the level of variance in terms of websites accessed by the portion of the device over the period of time further indicates a level of variance in terms of categories assigned to the websites accessed by the portion of the device over the period of time.

15. The system of claim 14, wherein the locking module applies the security profile to the portion of the device such that the security profile limits the portion of the device to accessing websites assigned to at least one of the same categories assigned to the websites accessed by the portion of the device over the period of time.

16. The system of claim 11, wherein the variance value that indicates the level of variance in terms of websites accessed by the portion of the device over the period of time further indicates a level of variance in terms of measurements of security riskiness assigned to the websites accessed by the portion of the device over the period of time.

17. The system of claim 16, wherein the locking module applies the security profile to the portion of the device such that the security profile limits the portion of the device to accessing websites having measurements of security riskiness corresponding to the measurements of security riskiness assigned to the websites accessed by the portion of the device over the period of time.

18. The system of claim 11, wherein the identification module identifies at least a portion of the device at least in part by:
identifying a subsystem executing on the device; or
identifying the entire device.

19. The system of claim 18, wherein:
the identification module identifies at least a portion of the device by identifying the subsystem executing on the device; and
the system is configured such that:
the identification module identifies an additional, second device;
the identification module further detects that the additional, second device also contains another instance of the subsystem executing on the device; and
the locking module further applies, based on detecting that the additional, second device also contains another instance of the subsystem executing on the device, the security profile to the other instance of the subsystem executing on the additional, second device.

20. A non-transitory computer-readable medium comprising one or more computer-readable instructions that, when executed by at least one processor of a computing device, cause the computing device to:
identify at least a portion of a device;
measure a variance value that indicates a level of variance in terms of websites accessed by the portion of the device over a period of time; and
lock, in response to determining that the variance value satisfies a threshold level of simplicity, the portion of the device by applying a security profile to the portion of the device that limits the portion of the device to accessing a set of websites that is defined in terms of the websites accessed by the portion of the device over the period of time.

* * * * *